July 14, 1959

R. B. COLT ET AL 2,894,391

PORTABLE MOTOR-ASPIRATED PSYCHROMETER

Filed July 2, 1956

INVENTORS
RUTGER B. COLT.
ALEXANDER UCHUCK

BY K.Y. Doub

ATTORNEY

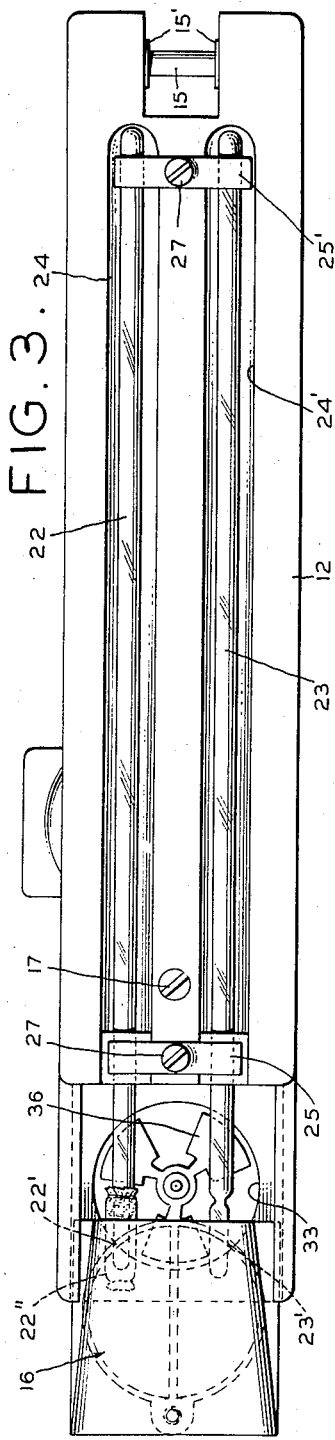

July 14, 1959 R. B. COLT ET AL 2,894,391
PORTABLE MOTOR-ASPIRATED PSYCHROMETER
Filed July 2, 1956 4 Sheets-Sheet 3
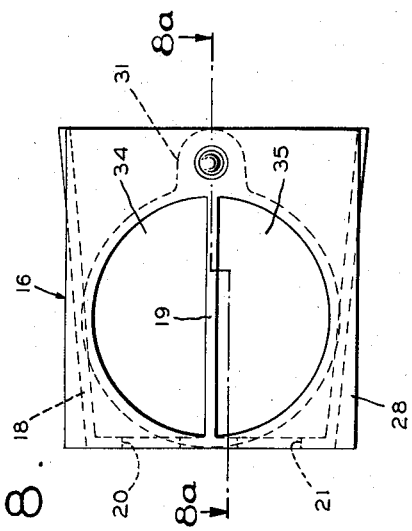
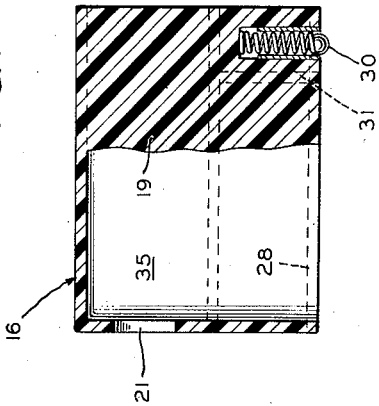
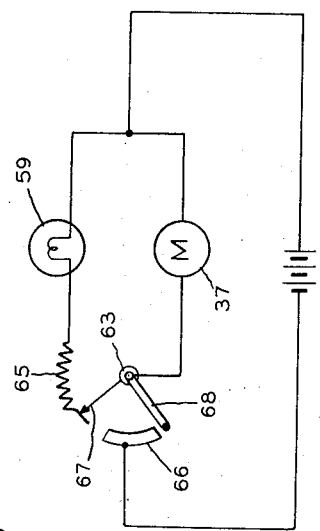
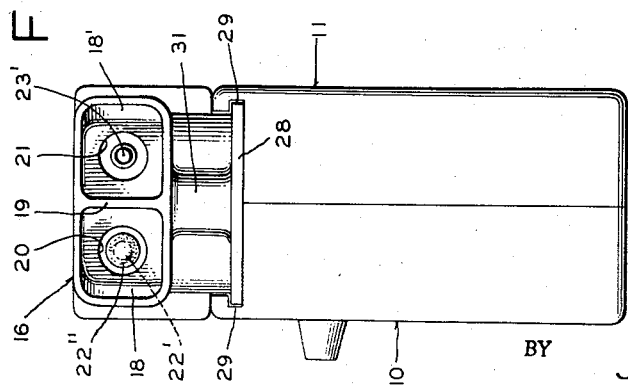
INVENTORS
RUTGER B. COLT
ALEXANDER UCHUCK
BY
K.G. Doub
ATTORNEY July 14, 1959 R. B. COLT ET AL 2,894,391
PORTABLE MOTOR-ASPIRATED PSYCHROMETER
Filed July 2, 1956 4 Sheets-Sheet 4

INVENTORS
RUTGER B. COLT
ALEXANDER UCHUCK
BY
K. G. Doub
ATTORNEY

United States Patent Office 2,894,391
Patented July 14, 1959

2,894,391

PORTABLE MOTOR-ASPIRATED PSYCHROMETER

Rutger B. Colt, Baltimore, and Alexander Uchuck, Randallstown, Md., assignors to Bendix Aviation Corporation, Baltimore, Md., a corporation of Delaware Application July 2, 1956, Serial No. 595,459

9 Claims. (Cl. 73—338.6)

This invention relates to psychrometers, and is particularly concerned with portable, self-contained psychrometers of the motor-aspirated type.

The primary object of the invention is to provide an improved portable motor-aspirated psychrometer for obtaining relative humidity or dew-point readings with equal facility in the laboratory, industrial plant or in field service, the wet and dry bulb thermometers and co-acting components being contained in a compact case readily accessible for inspection, repair and replacement of parts.

Another object is to provide a portable motor-aspirated psychrometer housed in a compact case so designed as to obtain a quick, accurate and dependable reading with controllable illumination simply by turning a control knob or the like, the said case being adapted for fabrication by molding or casting operations.

Another object is to provide a psychrometer of the type specified in which the wet bulb wick is wetted just preceding each test, the said wick being rendered conveniently accessible yet located for maximum aspirating effectiveness with respect to the psychrometer duct system.

Other objects and advantages will become apparent in view of the following description taken in connection with the drawings, wherein:

Fig. 3 is a top plan view of the instrument, with the duct member slid back or partially removed to show the motor aspirating fan therebelow;

Fig. 4 is an end view of the instrument looking into the duct system;

Fig. 5 is a substantially central longitudinal section showing one of the case half-sections with the various components located in the mold cavities provided therefor;

Fig. 7 is a wiring diagram;

Fig. 8 is a bottom plan view of an aspirating intake duct member and bulb-end housing; and Fig. 8a is a section taken on the line 8a—8a, Fig. 8.

Figure 1:
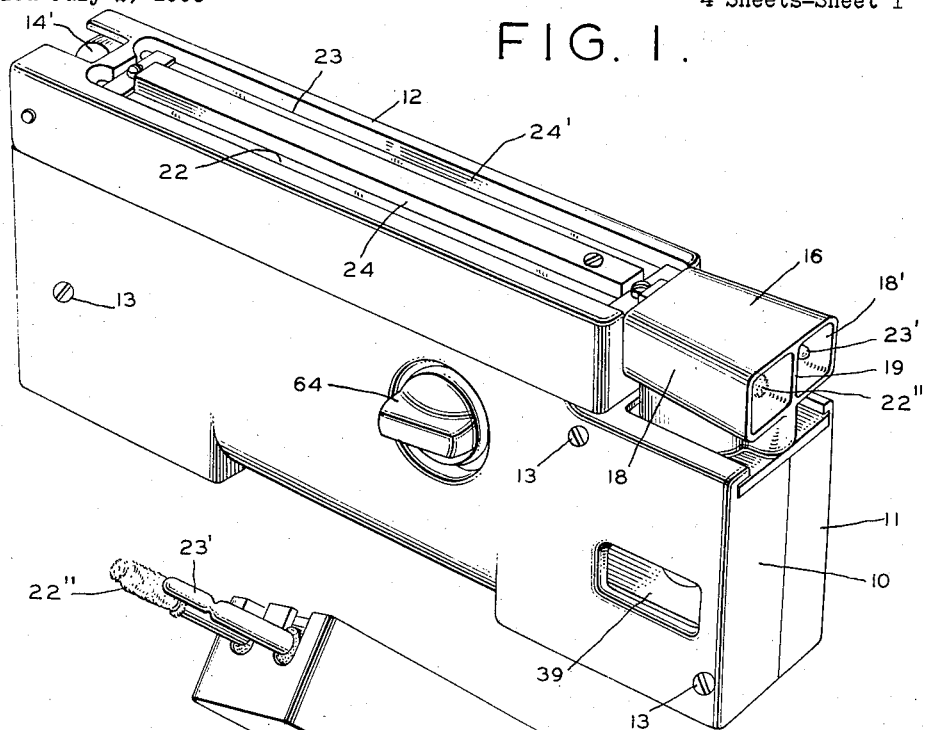
Fig. 1 is a view in perspective of the improved psychrometer as viewed from the control side of the instrument.
Figure 2:
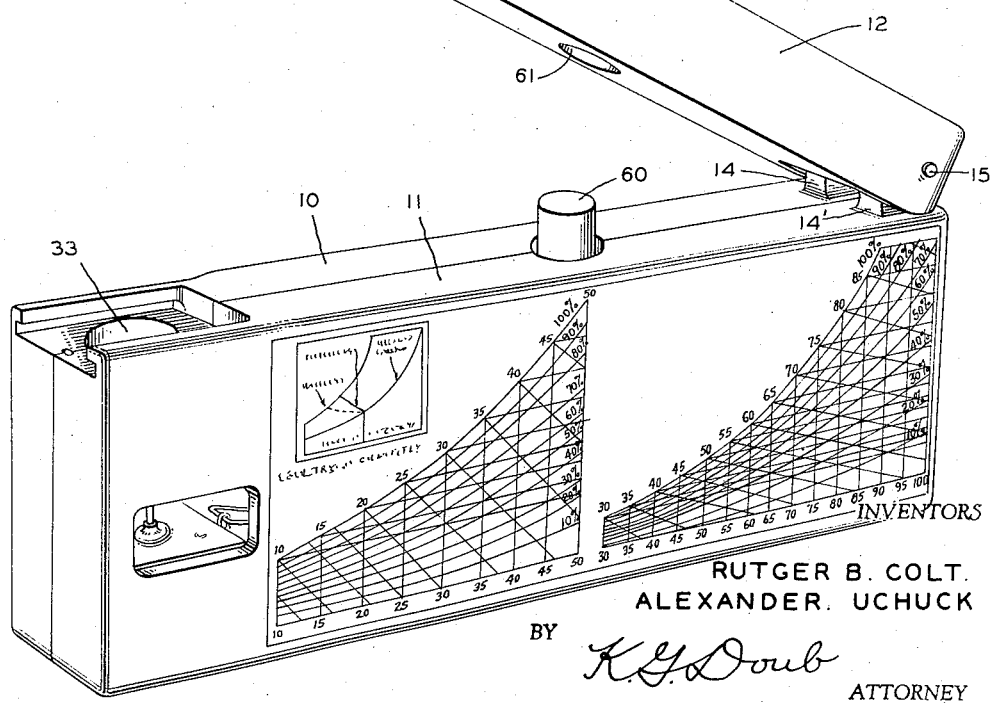
Fig. 2 is a view similar to Fig. 1 looking from the opposite side of the instrument, the thermometer-housing section being partly raised to its hinged-back position.

Referring to the drawings in detail, the case for the instrument comprises essentially three main parts, two mating half-sections 10 and 11, and a top thermometer-housing section 12. These respective sections may be made in any desired manner and of any suitable material; in practice they are molded from thermo-plastic or thermo-setting material and are either opaque or translucent, or certain parts opaque and others translucent, depending upon specifications. The case half-sections 10 and 11 are detachably connected as by screws 13, while the top section 12 is pivoted at its rear extremity between a pair of spaced hinge bosses 14, 14' formed on the side sections, through which a hinge pin 15 projects, said pin being detachably retained in installed position by means of thin spring clips 15', which engage in annular grooves formed in said pin, compare Figs. 3 and 5. This hinge pin also serves as a convenient connection for a carrying strap or handle. The top section 12 is releasably held in its "down" or closed position by a screw 17.

An aspirating intake duct member and bulb-end housing is indicated at 16; it is formed with dual intake chambers or aspirating passageways 18, 18', which are preferably flared outwardly and are separated by a partition 19, compare Figs. 3, 4 and 5. The wall at the rear end of the duct member is formed with openings 20, 21 for receiving the mercury bulb ends 22' and 23' of wet and dry bulb thermometers 22 and 23, the bulb end 22' being covered by a wick 22". These thermometers are located in a pair of longitudinally-extending parallel recesses or cavities 24, 24' formed in the top section 12, and at their opposite extremities the thermometers are removably fixed in place by means of clamp brackets 25 and 25', which engage over resilient gaskets 26 and are secured in place by means of screws 27, projecting through the centers of said brackets into threaded inserts fixed in the top section material immediately therebelow.

The intake duct member and bulb-end housing 16 is provided with a flanged base 28, the opposite side edges of which engage in runway or slide grooves 29, formed in the top portions of the adjacent side sections 10, 11, note Fig. 4. When the member 16 is slid in place, it is automatically latched by means of a spring-pressed detent 30, shown located in a central web section 31 (Figs. 5, 8 and 8a), said detent engaging a notch 32 provided therefor in the half-sections 10 and 11. The intake aspirating chambers or passageways 18, 18' communicate with a main aspirating duct 33 through a pair of semi-circular passages 34 and 35, which are separated by an extension of partition 19. A fan 36 is located at the lower end of the duct 33 and is driven by a motor 37, located in a compartment 38.

When the fan 36 is rotated, air is drawn into the chambers or passages 18, 18' in contact with the wick 22" and bulb end 23' of the wet and dry bulb thermometers, thence downwardly through the duct 33 and out through exhaust openings 39, located in transverse alignment in the half-sections 10 and 11 adjacent the lower end of duct 33. The flared contour of the chambers or passages 18, 18' causes the air to be forced into intimate contact with the wick and bulb ends of the thermometers.

Figure 6:
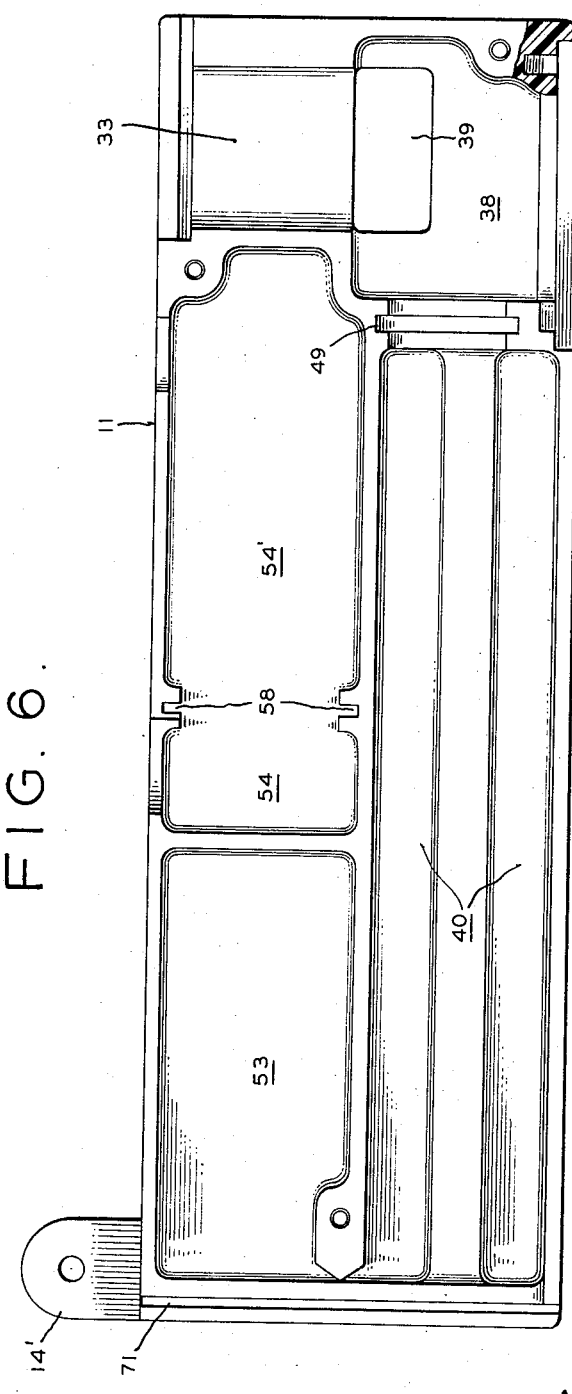
Fig. 6 is a plan or inner side view of the case half-section which matches that of Fig. 5.
Figure 6A:
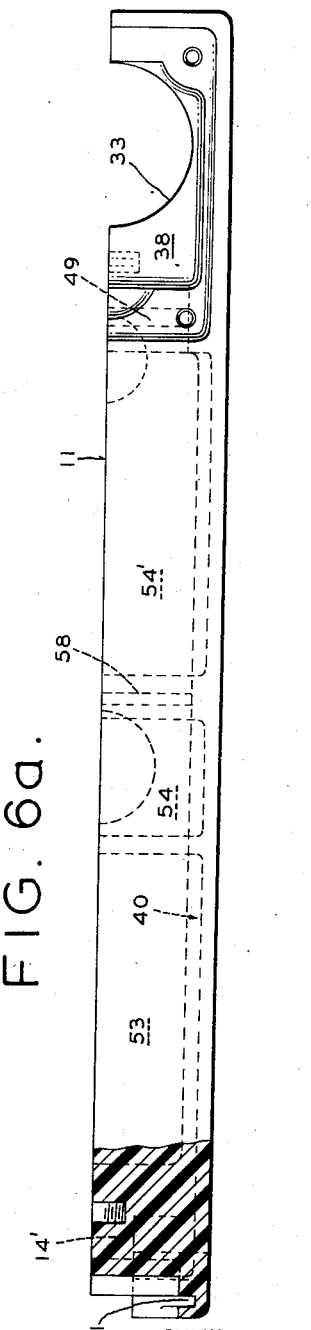
Fig. 6a is a sectional side elevation of Fig. 6.

Figs. 5 and 6 show the interior construction of the half-sections 10 and 11 which make up the psychrometer casing proper. In these sections there are a series of mold cavities which when mated define compartments or chambers adapted to receive various parts of the psychrometer assembly. Thus an elongated compartment 40 is adapted for a series of dry batteries 41, 42 and 43, provided with the usual positive and negative contacts 44 and 45 at the opposite ends thereof. At one end of the battery compartment is a spring contact clip 46, which is pivotally secured to the adjacent web section of the case by means of a screw 47 and is provided with a terminal 46', wired into the motor and light circuit in a manner to be described. At the opposite end of the battery compartment 40 is a small terminal block 48, which slidably engages in mating grooves or recesses 49 formed in the adjacent case material and has fixed to its one side a resilient battery contact 50 and to its opposite side a pair of generally U-shaped spring contact terminals 51. The shorter legs of the terminal clips 51 are wired to the positive and return sides of the electric circuit while the longer legs of said clips resiliently engage a pair of brush terminals 52, carried by brush holders 52', which extend forwardly and conduct current to and from the motor brushes, not visible.

A compartment 53 at one end of the holder section 10 provides a convenient receptacle for a dropper bottle 53', containing a supply of distilled water.

A center compartment 54 has located therein a lamp socket 55 of the bayonet type, which is supported by a spring clip 56, clamped to an H-shaped mounting plate 57, which is slidably and removably engaged in a pair of parallel grooves 58, formed in the adjacent material of the sections 10 and 11. A small light bulb or lamp 59 engages in the socket 55 and is provided with a filter cap 60, which telescopes over the socket and projects upwardly into an opening or cavity 61, formed in the top section 12. The lamp 59 provides a source of illumination for the area to be illuminated and in which area the wet and dry bulb thermometers 22 and 23 are located.

When the mounting plate 57 is in place, it separates the compartment 54 into another compartment 54', which provides a space for a cylindrical combined rheostat and switch member, generally indicated at 62. The rheostat and switch member may be of any preferred type procurable in the open market; it includes a shaft 63, having secured on the outer end thereof a knob or finger grip 64. In practice, the light 59 and motor 37 are wired in parallel as illustrated in Fig. 7, the rheostat controlling the light and the switch the motor. The rheostat resistance is indicated at 65 and the switch contact at 66. A resistance wiper arm 67 and a contact wiper arm 68 are secured on the inner end of shaft 63. When the shaft 63 is rotated, motor 37 is energized while at the same time the light resistance 65 may be adjusted to obtain the desired illumination without deenergizing the motor.

At the rear end of the case, the compartments 40 and 53 are closed by a slide door 70, so as to provide convenient access to the battery and water-bottle compartments. The slide door 70 has its opposite side edges engaged in grooves 71, formed in the adjacent half-sections 10 and 11.

The motor assembly includes a frame member 72, carrying pole pieces 73, said frame member also providing a support for the brush terminals 52. The frame 72 is connected to a base plate 74, which in turn is fixed to a mounting plate 75, removably connected to a recessed portion of the bottom of the case by screws 76. When the screws 76 are removed, the entire motor assembly may be removed and replaced as a unit without disturbing the circuit wiring, and this advantage also holds true with respect to the battery 41 and/or terminal block 48.

*General assembly and operation*

As heretofore indicated, the case halves or sections 10 and 11 are preferably molded from relatively light material, as for example suitable thermo-setting plastic, which can be of attractive colors and design.

In assembling the instrument, the case section 10 may be utilized as the holding or supporting section for the various components, and after these are located in the section 10, the other half-section 11 may then be applied over the holding section. For example, the mounting plate 57 carrying the lamp assembly may be slid in place in the section 10, as can also the motor terminal block 48 and the rheostat and contact member 62 prior to connecting the two half-sections together. These parts can be wired either before or after being assembled into the case section 10. Following installation and wiring of these parts, the section 11 may be mated with the section 10 and connected to the latter by means of the screws 13. The thermometer housing 12 may then be connected to the case proper simply by inserting the screw 17 and the hinge pin 15, the latter being locked in place by means of removable spring clips 15', it being assumed that the thermometers 22 and 23 have been previously fixed in the thermometer housing by the clamp brackets 25 and 25'. The air intake member 16 may then be slid into place over the bulb ends of the thermometers until the detent 30 engages in its notch 32.

The motor assembly may be mounted in the half-section 10 before the two half-sections 10 and 11 are joined, or it may be mounted after joining of said sections.

The case is now ready to receive the dry batteries 41, 42 and 43 and the dropper bottle 53'. When the batteries are to be inserted, the spring contact 46 may be pivoted on its screw 47 to clear the end of the battery compartment. After bottle 53' has been inserted in its compartment 53, the door 70 is slid in place and the instrument is ready for use.

The operation of psychrometers of this general type is common knowledge to those skilled in the art. Briefly, it is only necessary to wet the wick 22" of the wet bulb thermometer 22 with the dropper bottle 53'. To gain access to the wick, the air intake member 16 may be easily slid back to clear the wick. Control knob 64 is then turned clockwise until the motor 37 is energized. The motor may remain turned on until the thermometers stabilize, or the minimum wet bulb temperature is reached, whereupon a comparison is made with the dry bulb thermometer in the usual manner and the conventional chart or psychrometric tables consulted to obtain the proper relative humidity or dew-point reading. If the reading is being taken in a space where the light is poor, or where illumination is required to properly read the thermometers, it is only necessary to turn the knob 64 in a clockwise direction until the required amount of illumination is obtained. Thus a single control is all that is required for both the light source and motor.

To replace the lamp bulb, the screw 17 is removed and the thermometer housing turned back on its hinge pin 15, whereupon the lamp compartment is rendered accessible.

From the foregoing it will be apparent that a portable motor-aspirating psychrometer is provided which may be conveniently molded or cast in separate sections and then assembled in knock-down relation. Ordinarily it will not be necessary to disassemble the case sections 10 and 11 unless it is desired to replace parts of the electrical components. At all other times, batteries may be replaced simply by sliding back the rear door 70, the said door also providing access to the dropper bottle compartment 53.

In certain instances it may be desired to make the intake member or housing 16 integral with the thermometer housing 12, in which case the slideways for the member 16 would be eliminated and the entire top thermometer section would hinge back on the main side sections 10 and 11. Obviously the specific design of the various compartments may be altered to suit different types and sizes of components, and other changes in design adapted to meet specifications.

What is claimed is:

1. In a portable motor-aspirated psychrometer, an elongated case made up of removably-connected mating sections formed interiorly thereof with mating cavities which when the sections are joined define a plurality of compartments including a battery compartment housing a battery, a motor compartment having a motor therein, and an aspirating duct adjacent the motor compartment; a thermometer housing overlying and removably connected to said case and having a pair of longitudinally extending recesses therein, a dry bulb and a wet bulb thermometer fixed in said recesses with their bulb ends projecting over said aspirating duct, a duct member overlying said aspirating duct and defining air passages in substantial longitudinal alignment with said recesses into which passages said bulb ends project, said aspirating duct communicating with the atmosphere across said passageways, a fan driven by said motor and effective to produce a forced circulation of air through said passageways and said aspirating duct, an electrical circuit including a control switch electrically connecting said battery with said motor, and a control for said switch located exterior of said case.

2. In a portable motor-aspirated psychrometer, an elongated case made up of removably connected mating sections formed interiorly thereof with mating cavities which when the sections are joined define a plurality of compartments including a battery compartment housing a battery, a motor compartment having a motor therein, an aspirating duct adjacent the motor compartment, a light socket compartment having a light socket fixed therein, and a control switch compartment having control switch means therein; a thermometer housing overlying and removably connected to said case and having a pair of longitudinally-extending recesses therein, a dry bulb and a wet bulb thermometer fixed in said recesses with their bulb ends projecting over said aspirating duct, said thermometer housing having a light chamber overlying said light socket compartment, said light socket having a lamp therein projecting into said light chamber, a duct member overlying said aspirating duct and defining air passages in substantial longitudinal alignment with said recesses into which passages said bulb ends project, said aspirating duct communicating with the atmosphere across said passageways, a fan driven by said motor and effective to produce a forced circulation of air through said passageways and aspirating duct, an electrical circuit including said control switch means electrically connecting said battery with said motor and said light socket, and a manually-operable member for controlling said switch means located exterior of said case.

3. A psychrometer as claimed in claim 2 wherein said light socket and said motor are wired in parallel, and said switch means comprises an on-and-off contact element and a wiper arm therefor connected into the motor side of the circuit and a rheostat resistance and a wiper arm therefor connected into the lamp side of the circuit, said manually-operable control member having a common adjusting and setting connection to both of said arms.

4. In a portable motor-aspirated psychrometer, an elongated case made up of a pair of mating sections formed interiorly thereof with mating cavities which when the sections are joined define a plurality of compartments including a battery compartment housing a battery, a motor compartment having a motor therein, an aspirating duct adjacent the motor compartment, a light socket compartment having a light socket fixed therein, and a control switch compartment having a control switch therein; a thermometer housing overlying said case and having a pair of longitudinally extending recesses therein, a dry bulb and a wet bulb thermometer fixed in said recesses with their bulb ends projecting over said aspirating duct, said thermometer housing having a light chamber overlying said light socket compartment, said light socket having a lamp therein projecting into said light chamber, a duct member overlying said aspirating duct and defining air passages in substantial longitudinal alignment with said recesses into which passages said bulb ends project, said aspirating duct communicating with the atmosphere across said passageways, a fan driven by said motor and effective to produce a forced circulation of air through said passageways and aspirating duct, an electrical circuit including said control switch electrically connecting said battery with said motor and said light socket, and means for controlling said switch located exterior of said case, said thermometer housing being hinged at one extremity to said case and said duct member being slidably connected to the opposite extremity of said case in substantial longitudinal alignment with said thermometer housing.

5. In a portable motor-aspirated psychrometer, an elongated case made up of a pair of mating half-sections formed interiorly thereof with mating cavities which when the sections are joined define a plurality of compartments including a battery compartment, a motor compartment and an aspirating duct adjacent the motor compartment; a thermometer housing overlying said case and having a pair of longitudinally extending recesses therein, a dry bulb and a wet bulb thermometer fixed in said recesses with their bulb ends projecting over said asiprating duct, and a duct member overlying said aspirating duct and defining intake air passages in substantial longitudinal alignment with said recesses into which passages said bulb ends project, said aspirating duct communicating with the atmosphere across said passageways, said duct member being slidably mounted on said case in substantially straight-line relation with respect to the adjacent end of said thermometer housing, and means for releasably retaining said duct member in its operating position.

6. A psychrometer as claimed in claim 5 where in the passages in said duct member converge from the intake ends thereof toward the ends through which the thermometers project.

7. In a portable motor-aspirated psychrometer, an elongated generally rectangular case made up of a pair of mating half-sections formed interiorly thereof with mating cavities which when the sections are joined define a battery compartment, a water bottle compartment, a motor compartment, an aspirating duct adjacent the motor compartment, a light socket compartment and a control switch compartment; a thermometer housing overlying said case and having a pair of longitudinally extending recesses therein, a dry bulb and a wet bulb thermometer fixed in said recesses with their bulb ends projecting over said aspirating duct, said thermometer housing also having a light chamber overlying said light socket compartment, a duct member slidably mounted at one extremity of the case and having intake air passages in substantial longitudinal alignment with said recesses into which passages said bulb ends project, said aspirating duct communicating with the atmosphere across said passageways, said thermometer housing being hinged at one extremity to said casing so as to be conveniently swung back to clear said light socket compartment and said duct member being slidably mounted on the opposite extremity of said case in a manner such as to permit it to be slid back to clear the bulb ends of said thermometers.

8. In a portable motor-aspirated psychrometer, an elongated case made up of removably connected mating sections formed interiorly thereof with mating cavities which when the sections are joined define a plurality of compartments including a battery compartment receiving a battery, a motor compartment having a motor therein, an aspirating duct adjacent the motor compartment, a light socket compartment having a light socket fixed therein, and a control switch compartment having a control switch therein; a thermometer housing overlying and removably connected to said case and having a pair of longitudinally extending recesses therein, a dry bulb and a wet bulb thermometer fixed in said recesses with their bulb ends extending over said aspirating duct, said thermometer housing having an area to be illuminated overlying said light socket compartment, said light socket having a lamp therein for illuminating said area, a fan driven by said motor and effective to produce a forced circulation of air through said aspirating duct and over the bulb ends of said thermometers, an electrical circuit including said control switch electrically connecting said battery with said motor and said light socket, means for controlling said switch located exterior of said case, said thermometer housing being freely detachable from said case to facilitate access to said lamp.

9. In a portable motor-aspirated psychrometer, an elongated case made up of a pair of removably connected mating half-sections formed interiorly thereof with mating cavities which when the sections are joined define a plurality of compartments including a battery compartment having a battery removably disposed therein, a motor compartment having a motor removably mounted therein, an aspirating duct adjacent the motor compartment, a light socket compartment having a light socket fixed therein, and an electrical circuit including a control switch interconnecting said battery, said motor and light socket; a thermometer housing overlying and removably connected to said case and carrying dry and wet bulb thermometers located with their bulb ends extending over said aspirating duct, said thermometer housing having an area to be illuminated overlying said light socket compartment, a fan driven by said motor and effective to produce a forced circulation of air through said aspirating duct and over the bulb ends of said thermometers, said electrical circuit including a terminal block slidably mounted in mating grooves formed in said case half-sections between said battery compartment and motor compartment, said motor having a pair of brush terminals located in said motor compartment, said terminal block having a spring contact connected to the battery compartment side thereof for contact with an adjacent battery terminal and a pair of spring contacts connected to the motor compartment side thereof for contact with said brush terminals, to thereby facilitate removal and replacement of said motor, said battery and/or said block independently of one another and without disturbing the electrical circuit.

References Cited in the file of this patent

UNITED STATES PATENTS

| | | |
|---|---|---|
| 1,234,529 | Comins | July 24, 1917 |
| 2,688,252 | King | Sept. 7, 1954 |